3,433,664
BONDING TEXTILES TO RUBBERS
Alan P. Osborne, Wood End, near Atherstone, England, assignor to The Dunlop Company Limited, London, England, a British company
No Drawing. Filed July 26, 1965, Ser. No. 475,017
Claims priority, application Great Britain, Aug. 20, 1964, 33,997/64
U.S. Cl. 117—76   15 Claims
Int. Cl. B44d 1/12, 1/22; C08d 13/16

ABSTRACT OF THE DISCLOSURE

A textile material is bonded to a curable rubber composition based on a mono-olefine rubber, a diolefine rubber, or mixtures thereof, employing as an adhesive an admixture of an aqueous dispersion of an incompletely condensed phenolic resin and an aqueous polymer dispersion of a diene monomer and acrylonitrile, the amount of the acrylonitrile being 1–15% by weight based on the total polymer content of the dispersion.

---

This invention relates to the bonding of textiles to rubbers, including mono-olefine rubbers.

According to the present invention a method of bonding a textile material to a curable composition based on a mono-olefine rubber and/or a diolefine rubber which comprises treating the textile material with an adhesive composition comprising an admixture of an aqueous dispersion of an incompletely condensed phenolic resin and an aqueous polymer dispersion comprising a copolymer of a diene monomer and acrylontrile, the said polymer dispersion containing from 1 percent to 15 percent by weight of the acrylonitrile based on the total polymer content of the dispersion, drying the treated textile material, coating the said textile material with the curable mono-olefine and/or diolefine rubber composition, and heating the assembly to cure the rubber composition.

The said polymer dispersion may be either unblended or a blend of an aqueous dispersion of a copolymer of from 20 percent to 80 percent by weight of a diene monomer and correspondingly from 80 percent to 20 percent by weight of acrylonitrile with an aqueous dispersion of a polymer or copolymer of a diene monomer, the said blend containing from 1 percent to 15 percent by weight of acrylonitrile based on the total polymer content of the blend.

It is preferred that the acrylonitrile content of the adhesive composition based on the total elastomer polymer present should be from 3 percent to 8 percent by weight.

The conjugated diene monomer which is copolymerized with the acrylonitrile can be any of the butadiene-1,3 hydrocarbons such as butadiene-1,3 itself, 2-methyl butadiene-1,3 (isoprene), 2,3-dimethyl butadiene-1,3, piperylene, 1-phenyl butadiene-1,3, 2-phenyl butadiene-1,3, 2-neopentyl butadiene-1,3, and other hydrocarbon homologues of butadiene-1,3. Any of the straight chain conjugated dienes or the straight and branched chain hexadienes can be used but the butadiene-1,3 hydrocarbons are preferred.

It is in general preferred to use the blend comprising in aqueous dispersion a copolymer of a conjugated diene monomer and acrylonitrile, having a high acrylonitrile content. The aqueous dispersion which is blended with the conjugated diene/acrylonitrile copolymer dispersion, and which acts as a diluent to bring the acrylonitrile content of the total elastomer polymer to not greater than 15 percent by weight, can be a latex of a polymer or copolymer of any of the conjugated dienes mentioned in the immediately preceding paragraph. A particularly suitable copolymer latex is a rubbery butadiene/styrene copolymer latex and a suitable polymer latex is a polybutadiene latex.

A preferred incompletely condensed phenolic resin is one which is soluble in water or in dilute alkaline solution. An alkali-soluble resorcinol/formaldehyde resin is especially suitable in the practice of this invention.

Suitable adhesive compositions have ratios of phenolic resin to elastomer polymer and/or copolymer which can be varied over quite considerable limits, for example from 1:9 to 9:1.

The copolymer of the conjugated diene and the acrylonitrile is preferably prepared by means of emulsion polymerization in an aqueous medium. The aqueous dispersion of the copolymer can be prepared at an elevated temperature in the presence of a suitable catalyst such as a soluble persulphate, or preparation can take place at a reduced temperature, for which a redox catalyst is preferred.

The adhesive compositions are preferably prepared by adding the aqueous dispersion of the phenolic resin to the aqueous dispersion of the conjugated diene monomer/acrylonitrile copolymer or, when the acrylonitrile content of the copolymer is high, the blend thereof with the aqueous dispersion of the polymer or copolymer of at least one conjugated diene.

An aqueous dispersion of resorcinol/formaldehyde resin, suitable for use in the preparation of the adhesive, can be prepared by dissolving resorcinol in water and adding formaldehyde. The blend of aqueous polymeric dispersions, to which there has been added a small amount of a resorcinol/formaldehyde polymerization catalyst such as a dilute caustic soda solution and the resorcinol/formaldehyde dispersion are then admixed in the proportions desired. Preferably, the mixture is then matured for a minimum period of 12 hours prior to its use as an adhesive. Mixed dispersions suitable for the practice of this invention usually have a total solids content of from 5 percent to 30 percent but preferably from 10 percent to 20 percent.

By the term "mono-olefine rubbers" in this specification there are included rubbery polymers and copolymers of at least one alpha-mono-olefine and also interpolymers of at least two alpha-mono-olefines with at least one additional compound serving to confer unsaturation on the uncured interpolymer.

The additional copolymerizable compound which confers unsaturation on the interpolymer can comprise up to 15 mole percent or more, but preferably from 0.5 to 5 mole percent, of the interpolymer.

The alpha-mono-olefines of the copolymers and the interpolymers can be selected from ethylene, propylene, butylene and higher homologues but generally alpha-mono-olefines containing from 2 to 4 carbon atoms are prefered with the additional preference that ethylene should be one of the alpha-mono-olefines. Elastomers of particular value are those obtained with ethylene and propylene as the alpha-mono-olefines, especially when the ethylene component provides from 40 to 60 mole percent of the olefine content; the ethylene content can, however, be as high as about 80 mole percent. Other combinations of alpha-mono-olefines which can be employed in the present invention include ethylene and pentene-1, ethylene and heptene-1 and ethylene and octene-1.

The compound which confers unsaturation on the interpolymer, that is, which gives rise to a polymer unit containing at least one double bond, can be for example an open-chain diolefine compound or an acetylene or cyclic diene monomer, including a bridged-ring-hydrocarbon which contains at least two double bonds. Examples of suitable compounds are conjugated and unconjugated dienes such as butadiene, isoprene, piperylene, dimethylbutadiene, hexadienes, and higher homologues; cyclic dienes such as cyclopentadiene and its derivatives are also suitable. Particularly suitable compounds of the bridged-ring type are described in patent specification No. 880,904.

The mono-olefine rubbers can be cured by means of organic peresters or peroxides, dicumyl peroxide being the preferred peroxide, with or without the addition of a small amount of sulphur. The interpolymers containing unsaturated groups, however, can if desired be cured by means of sulphur and the usual rubber activators and accelerators. The mono-olefine rubbers can contain reinforcing agents, such as carbon black, and also plasticizers, antioxidants and fillers.

In the preferred method of bonding textile material to a mono-olefine rubber composition or diolefine rubber composition the textile is treated with the adhesive composition and allowed to dry, preferably at a temperature between 100° C. and 220° C. The treated textile is then coated with the curable rubber composition and the rubber cured by heating the resulting assembly at an appropriate temperature and for a suitable time.

Natural and synthetic textile materials can be bonded to rubber compositions in accordance with the method of the present invention. The invention is of especial value for bonding fibres of polyamides e.g. nylon, and polyesters, for example, polyethylene glycol terephthalate.

It has been found that adhesion of rubbers to polyesters, such as polyethylene glycol terephtalate, is considerably improved when the fibers are given an initial treatment with a composition comprising polyvinyl chloride and a cross-linking agent such as triallyl cyanurate or a polyamide resin, with an isocyanate, with a polyethylene imine or with hexamethylene diethylene urea before treatment with a latex/resorcinol/formaldehyde adhesive. For adhesion of the initially-treated polyester fibres to curable rubber compositions the adhesives of this invention show improved results over butadiene/styrene/vinyl pyridine terpolymer latex/resorcinol/formaldehyde adhesives.

Rayon, cotton and other fibres can also be bonded to mono-olefine and diolefine rubber compositions by the method of this invention and bonds of outstanding strength are obtained as compared with other known rubber/textile adhesives such as natural rubber latices, butyl rubber latices, butadiene/styrene latices and even butadiene/styrene/vinyl pyridine terpolymer latices, when the latices are admixed with phenol/formaldehyde solutions.

In general the blends of aqueous dispersions which can be used in the practice of the present invention have the advantage over the aqueous dispersions of the straight copolymers containing from 1 percent to 15 percent of acrylonitrile that they can be prepared at considerably lower cost since many of the diluent latices of polymers and copolymers of diene monomers are produced in large quantities and are commercially available at comparatively low cost. When the acrylonitrile content of the basic copolymer latex is high, the proportion of the less expensive diluent latex is correspondingly high.

The invention is illustrated by the following examples in which nylon and rayon cords treated with adhesives made according to the present invention were adhered to one or more of the following rubber compositions, all parts being parts by weight:

Composition A was based on an ethylene/propylene terpolymer.

| | A |
|---|---|
| Terpolymer | 100.0 |
| Fast extrusion furnace black | 40.0 |
| Zinc oxide | 5.0 |
| Mineral oil | 5.0 |
| Tetramethyl thiuram disulphide | 1.5 |
| Mercaptobenzthiazole | 0.5 |
| Sulphur | 1.75 |
| Cure required at 160° C. (mins.) | 75 |

The terpolymer in the above formula was an ethylene/propylene/dicylopentadiene (51.6/43.0/5.4) terpolymer. The mineral oil used was a paraffinic oil of low unsaturation.

Compositions B, C and D were based on natural rubber, cis-polybutadiene rubber, and a blend of natural rubber and a butadiene/styrene copolymer respectively, and had the following formulations:

| | B | C | D |
|---|---|---|---|
| Natural rubber | 100.0 | | 50.0 |
| Cis-polybutadiene | | 100.0 | |
| SBR | | | 50.0 |
| General purpose furnace black | 46.0 | | |
| Fast extrusion furnace black | | 40.0 | 40.0 |
| Zinc oxide | 6.0 | 5.0 | 5.0 |
| Stearic acid | 1.0 | 1.0 | 1.0 |
| Pine tar | 6.0 | | |
| Mineral oil | 4.0 | | |
| Dutrex RT | | 10.0 | 10.0 |
| BLE | | 1.5 | 1.5 |
| Diphenylnitrosamine | 0.5 | | |
| CBS | 0.7 | 1.0 | 0.75 |
| Sulphur | 2.6 | 1.75 | 2.15 |
| Cure required at 148° C. (min.) | 25 | 25 | 25 |

In the above table SBR refers to a butadiene/styrene (70/30) copolymer, Dutrex RT is the trade name for a process oil derived from petroleum, BLE is the trade name of a condensate of diphenylamine and acetone, and CBS is N-cyclohexyl benzthiazole-2-sulphenamide.

Example I

Six latex blends were prepared from a 60/40 isoprene/acrylonitrile latex by the addition of a butadiene/styrene (75/25) latex so that the blends contained 2.5 percent, 5.0 percent, 7.5 percent, 10 percent, 12.5 percent and 15 percent by weight of acrylonitrile based on the total weight of polymer present. The six latices were all adjusted to a total polymer content of 40 percent and to 250 parts of each were added 6 parts of a 10 percent solution of sodium hydroxide, diluted with 104.8 parts of water, slowly and with stirring. To each treated latex there was then added a solution of 11 parts of resorcinol in 200 parts of water to which solution 16.2 parts of a 37 percent solution of formaldehyde had been added. After thorough mixing, the latex/resorcinol/formaldehyde mixtures, which had a 20 percent total solids content, were matured for 24 hours at 23–24° C.

The matured latex/resorcinol/formaldehyde adhesive containing 2.5 percent, 5 percent, 7.5 percent, 10 percent, 12.5 percent and 15 percent of acrylonitrile based on the total elastomeric polymer content and numbered 1 to 6 respectively were applied to samples of nylon tire cord in the usual way, by drawing each cord sample through the adhesive under test and then drying. The nylon cord was nylon 66 of 850/2 denier construction.

Samples of each treated cord were embedded in each of the rubber compositions A and B and the compositions were cured. The strength of the bond between the treated nylon and the rubber was measured by the pull-through test described by J. O. Wood, Trans. I.R.I., Vol. 32, 1, 1–18 (1956) and the average figures (in pounds per centimetre are given in Table I. Each test figure given in this specification is the average of 12 pull-through tests.

TABLE I

| Adhesive | 1 | 2 | 3 | 4 | 5 | 6 |
|---|---|---|---|---|---|---|
| Acrylonitrile content | 2.5 | 5.0 | 7.5 | 10.0 | 12.5 | 15.0 |
| Composition A/nylon | 15.0 | 17.0 | 17.5 | 18.7 | 17.2 | 16.2 |
| Composition B/nylon | 23.1 | 25.2 | 25.5 | 24.6 | 21.2 | 20.2 |

The figures of Table I show a maximum nylon cord adhesion to both the natural rubber and ethylene/propylene terpolymer compositions when the acrylonitrile content of the adhesive based on the total elastomeric polymer present therein, was between 5 percent and 10 percent.

Example II

Four of the adhesives used in this example were prepared from a copolymer latex similar to that used in Example I except that isoprene was replaced by butadiene. Four latex/resorcinol/formaldehyde adhesives 7, 8, 9 and 10 containing 2 percent, 4 percent, 6 percent and 8 percent by weight respectively of acrylonitrile based on the total elastomeric polymer content were prepared in a similar way to those of Example I.

Nylon cords similar to those of Example I and rayon cords of a high tenacity type and of 1650/2 denier were treated with each of the adhesives in a way similar to that of Example I and adhesions between samples of the two cords and each of rubber compositions B, C and D were determined in a similar way, the average figures being given in Table II, in which a comparison is shown, for rubber compositions C and D, with a commercially available butadiene/styrene/vinyl pyridine (70/15/15) resorcinol formaldehyde adhesive, 11.

TABLE II

| Adhesive | 7 | 8 | 9 | 10 | 11 |
|---|---|---|---|---|---|
| Acrylonitrile content (percent) | 2.0 | 4.0 | 6.0 | 8.0 | |
| Natural rubber B: | | | | | |
|   Nylon | 21.6 | 24.4 | 24.6 | 23.6 | |
|   Rayon | ¹27.6 | ¹26.8 | ¹27.6 | ¹26.8 | |
| Cis-polybutadiene C: | | | | | |
|   Nylon | 19.5 | 20.5 | 20.2 | 18.6 | 16.8 |
|   Rayon | 25.8 | ¹26.9 | 26.3 | 24.2 | 24.4 |
| N.R./SBR. D: | | | | | |
|   Nylon | 17.5 | 20.7 | 20.2 | 22.6 | 17.7 |
|   Rayon | ¹26.0 | 25.4 | ¹26.0 | 25.0 | ¹27.0 |

¹ More than half the cords broke; the true pull-through figure was therefore greater than this figure indicates.

The results given in Table II show similar tendencies with changing acrylonitrile content to those of Table I. Adhesions to the natural rubber composition were a little greater than those to the polybutadiene composition and to the composition containing the natural rubber and butadiene/styrene copolymer blend. Adhesions to these latter two rubber compositions were better with the adhesives of this specification than those produced with the commercially available butadiene/styrene/vinyl pyridine latex, the margin of improvement being greater with nylon than with rayon.

The latex adhesives described in this specification have the advantage that they are particularly inexpensive to produce.

Having now described my invention—what I claim is:

1. A method of bonding a textile material to a curable rubber composition based on a rubber selected from the group consisting of a mono-olefine rubber, a diolefine rubber, and mixtures thereof which comprises treating the textile material with an adhesive composition comprising an admixture of an aqueous dispersion of an incompletely condensed phenolic resin and an aqueous polymer dispersion comprising a copolymer of a diene monomer and acrylonitrile, the said polymer dispersion containing from 1 percent to 15 percent by weight of the acrylonitrile based on the total polymer content of the dispersion, the ratio by weight of phenolic resin to total polymer content of the admixture being from 1:9 to 9:1, drying the treated material, coating the said textile material with the curable rubber composition, and heating the assembly to cure the rubber composition.

2. A method according to claim 1 wherein the polymer dispersion is a blend of an aqueous dispersion of a copolymer of from 20 percent to 80 percent by weight of a diene monomer and correspondingly from 80 percent to 20 percent by weight of acrylonitrile with an aqueous dispersion of a polymer or copolymer of a diene monomer, the said blend containing from 1 percent to 15 percent by weight of acrylonitrile based on the total polymer content of the aqueous blend.

3. A method according to claim 2 wherein the aqueous dispersion blended with the dispersion of a copolymer of a diene monomer and acrylonitrile is a butadiene/styrene copolymer latex.

4. A method according to claim 1 wherein the acrylonitrile content of the adhesive composition based on the total elastomer polymer present is from 3 percent to 8 percent by weight.

5. A method according to claim 1 wherein the diene monomer of the copolymer with acrylonitrile is butadiene-1,3.

6. A method according to claim 1 wherein the diene monomer of the copolymer with acrylonitrile is isoprene.

7. A method according to claim 1 wherein the phenolic resin is a resorcinol/formaldehyde resin.

8. A method according to claim 1 wherein the admixture of aqueous dispersions has a total solids content of from 5 percent to 30 percent.

9. A method according to claim 8 wherein the total solids content is from 10 percent to 20 percent.

10. A method according to claim 1 wherein the rubber composition is a natural rubber composition.

11. A method according to claim 1 wherein the rubber composition is a cis-poly-butadiene composition.

12. A method according to claim 1 wherein the rubber composition is a blend of natural rubber and butadiene/styrene copolymer.

13. A method according to claim 1 wherein the textile material is nylon cord.

14. A method according to claim 1 wherein the textile material is rayon cord.

15. A product obtained by the process of claim 1.

References Cited

UNITED STATES PATENTS

| | | |
|---|---|---|
| 3,030,230 | 4/1962 | Atwell. |
| 3,060,078 | 10/1962 | Atwell. |
| 3,240,659 | 3/1966 | Atwell. |
| 3,240,660 | 3/1966 | Atwell. |

WILLIAM D. MARTIN, *Primary Examiner.*

R. HUSACK, *Assistant Examiner.*

U.S. Cl. X.R.

117—138.8, 143, 145; 156—110